(12) United States Patent
Zheng (10) Patent No.: US 12,227,223 B2
(45) Date of Patent: Feb. 18, 2025

(54) BRAKING MECHANISM AND CHILD STROLLER

(71) Applicant: WONDERLAND SWITZERLAND AG, Steinhausen (CH)

(72) Inventor: Leilei Zheng, Dongguan (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 298 days.

(21) Appl. No.: 17/684,867

(22) Filed: Mar. 2, 2022

(65) Prior Publication Data

US 2022/0281507 A1    Sep. 8, 2022

(30) Foreign Application Priority Data

Mar. 2, 2021  (CN) .......................... 202110231872.9

(51) Int. Cl.
*B62B 9/08*     (2006.01)
*F16D 63/00*    (2006.01)

(52) U.S. Cl.
CPC .............. *B62B 9/082* (2013.01); *B62B 9/087* (2013.01)

(58) Field of Classification Search
CPC ........ B62B 9/082; B62B 9/087; F16D 63/006
See application file for complete search history.

(56) References Cited

U.S. PATENT DOCUMENTS

| 4,618,033 | A  | * | 10/1986 | Kassai .................... B62B 9/087 188/20 |
| 5,191,675 | A  | * | 3/1993  | Ishikura ................ B60B 33/025 16/35 R |
| 7,537,093 | B2 | * | 5/2009  | Chen ...................... B62B 9/087 188/31 |
| 8,418,816 | B2 | * | 4/2013  | Chen ...................... B62B 9/082 188/20 |

(Continued)

FOREIGN PATENT DOCUMENTS

| CN | 2774884 Y   | 4/2006 |
| CN | 101905710 A | 12/2010 |

(Continued)

OTHER PUBLICATIONS

Taiwan 1st Office Action issued in corresponding Taiwan Application No. 111107332, dated Apr. 10, 2023, pp. 1-9.

(Continued)

*Primary Examiner* — Thomas W Irvin
(74) *Attorney, Agent, or Firm* — HAUPTMAN HAM, LLP (57) ABSTRACT

A braking mechanism and a child stroller, where the braking mechanism includes a pedal part and a housing part connected to the pedal part, the housing part has two side walls and a middle wall sandwiched between the two side walls, a locking end is arranged on an outer side of each of the side walls, and a sliding groove is arranged on an inner surface of the middle wall, where the braking mechanism is further provided with an elastic piece part, the elastic piece part is (Continued)

provided with a highest point, and the braking mechanism is prevented from a false locking through a cooperation of the sliding groove and the highest point. The braking mechanism according to the disclosure has a function of preventing false locking, which can avoid a false locking phenomenon of the child stroller and improve the safety of the child stroller in use.

18 Claims, 11 Drawing Sheets

(56) References Cited

U.S. PATENT DOCUMENTS

| | | | | |
|---|---|---|---|---|
| 8,540,059 | B2* | 9/2013 | Li | B62B 9/087 188/73.1 |
| 8,596,421 | B2* | 12/2013 | Park | B60B 33/0049 188/19 |
| 9,150,236 | B2* | 10/2015 | Zhang | B62B 9/087 |
| 9,533,530 | B2* | 1/2017 | Hartenstine | B60B 33/0086 |
| 2004/0178025 | A1* | 9/2004 | Zweideck | B62B 9/087 280/250.1 |
| 2005/0006185 | A1* | 1/2005 | Kassai | B62B 9/082 188/19 |
| 2006/0151259 | A1* | 7/2006 | Tomasi | B62B 9/082 280/647 |
| 2008/0078630 | A1* | 4/2008 | Yeh | B62B 9/082 188/20 |
| 2013/0180805 | A1* | 7/2013 | Cheng | B62B 9/082 188/20 |
| 2013/0248302 | A1* | 9/2013 | Zhang | B62B 9/082 188/20 |
| 2013/0320641 | A1* | 12/2013 | Zhang | B62B 9/082 280/47.38 |

FOREIGN PATENT DOCUMENTS

| | | | | |
|---|---|---|---|---|
| CN | 201660004 | U | 12/2010 | |
| CN | 201792888 | U | 4/2011 | |
| CN | 201808594 | U | 4/2011 | |
| CN | 103213611 | A | 7/2013 | |
| CN | 203111272 | U | 8/2013 | |
| CN | 103359149 | A | 10/2013 | |
| CN | 106985892 | A | 7/2017 | |
| CN | 207191141 | U | 4/2018 | |
| CN | 207843039 | U | 9/2018 | |
| CN | 208827913 | U | 5/2019 | |
| DE | 102020203588 | A1 * | 9/2020 | B62B 5/0457 |
| KR | 20140052091 | A | 5/2014 | |
| TW | 540503 | U | 7/2003 | |

OTHER PUBLICATIONS

Chinese Search Report issued in corresponding Chinese Application No. 202110231872.9, dated Oct. 20, 2021, pp. 1-15.

* cited by examiner

BRAKING MECHANISM AND CHILD STROLLER

TECHNICAL FIELD

The application relates to a braking mechanism and a child stroller including the braking mechanism.

BACKGROUND

Child strollers can alleviate the fatigue caused by holding babies for a long time, and improve comfortability of people's life. The main structure of a child stroller generally includes a frame structure, and a wheel set, a seat part, and a backrest part disposed on the frame structure.

In order to improve the safety performance of the child stroller in use, a braking mechanism is usually installed on the child stroller, such that when the child stroller is in an opened state and not being pushed, the wheel assembly of the child stroller can be ensured in a braked state, so as to prevent the child stroller from moving on its own without being monitored. In the related art, there are various braking mechanisms for the child strollers. For example, the braking mechanism generally includes a brake disk fixed on a first part and a brake pin assembly slidably disposed on a second part. The brake pin assembly can be engaged with or disengaged from the brake disk, so as to activate or deactivate the braking mechanism. However, most of the brake mechanisms existing in the related art have complex structures.

In addition, in the related art, it is common to brake the rear wheels, the braking mechanism is activated by stepping on the brake pedals disposed on the rear wheels. However, in the braking mechanism based on the related art, there may be a phenomenon that the wheels are still not effectively locked while the brake pedal has been stepped to a certain position, and at this time, the operator of the braking mechanism mistakenly believes that the child stroller has been locked and thus relaxes monitoring of the child stroller, resulting in a danger of the child stroller rolling unexpectedly.

SUMMARY

In view of the above problems, a purpose of an aspect of the application is to provide a braking mechanism and a child stroller including the braking mechanism. The braking mechanism according to an aspect has an anti-false locking function, and can avoid the false locking phenomenon of the child stroller, thereby improving safety of the child stroller in use.

For this, according to an aspect of the application, a braking mechanism is provided. The braking mechanism includes a pedal part and a housing part connected to the pedal part, the housing part has two side walls and a middle wall sandwiched between the two side walls, a locking end is arranged on an outer side of each of the side walls, and a sliding groove is arranged on an inner surface of the middle wall, wherein the braking mechanism is further provided with an elastic piece part, and the elastic piece part is provided with a highest point, the braking mechanism is prevented from a false locking through a cooperation of the sliding groove and the highest point.

In an aspect, the pedal part and the housing part are integrally formed with an angle in respect to each other.

In an aspect, the pedal part and the housing part are integrally formed with an angle of 90 degrees in respect to each other.

In an aspect, the housing part includes the two side walls symmetrically arranged, and two locking ends are respectively symmetrically arranged on the outer sides of the two said side walls.

In an aspect, perforations are disposed on the side walls.

In an aspect, the locking ends and the perforations are arranged in an up-down direction or in a front-rear direction.

In an aspect, a plurality of ribs are disposed on the inner surface of the middle wall, and the sliding groove is formed between one of the ribs and the inner surface of the middle wall.

In an aspect, the ribs extend along the inner surface of the middle wall and inner surfaces of the side walls.

In an aspect, the elastic piece part includes a first end and a second end located on both sides of the highest point, and one of the first end and the second end is L-shaped.

In an aspect, the highest point is located at a middle position of the elastic piece part.

According to another aspect of the application, a child stroller is provided. The child stroller includes a frame structure and a wheel set, and the wheel set has the braking mechanism defined above.

In an aspect, the wheel set includes a wheel base, two wheels mounted on both sides of the wheel base, and hubs disposed on inner circumferences of the wheels, and slots for engaging the locking ends of the braking mechanism are formed between the hubs.

In an aspect, holes are formed on both sides of the wheel base, and the holes correspond to the perforations of the braking mechanism for pivotally connecting the braking mechanism to the wheel base.

In an aspect, two depressions are formed on both sides of the wheel base, such that the two side walls of the braking mechanism can be accommodated therein.

In an aspect, the wheel base is provided with a first recess and a second recess respectively corresponding to the first end and the second end of the elastic piece part of the braking mechanism, and one of the first recess and the second recess is L-shaped.

In the braking mechanism according to an aspect of the application and the child stroller including the braking mechanism, the braking mechanism according to an aspect can achieve the function of preventing false locking through the arrangement of the highest point of the elastic piece part, and the operator can confirm by himself whether the child stroller has been effectively locked, thus avoiding false locking phenomenon of the child stroller and greatly improving the safety of the child stroller in use.

BRIEF DESCRIPTION OF THE DRAWINGS

The accompanying drawings are included herein to provide a further understanding of the disclosure, and are incorporated into this specification to constitute a part of this specification. The accompanying drawings illustrate embodiments of the disclosure, and are used together with the following description to illustrate the concept of the disclosure.

In the drawings:

FIG. 2 is a structural schematic view showing a wheel set of the child stroller according to the application, where a pedal part is not stepped on;

FIG. 3 is a structural schematic view showing the wheel set of the child stroller according to the application, where the pedal part has been stepped on;

DETAILED DESCRIPTION

Hereinafter, example embodiments will be described in detail with reference to the accompanying drawings. Although the disclosure is susceptible to various modifications and alternatives, specific embodiments thereof are shown by way of example in the accompanying drawings. However, the disclosure should not be construed as being limited to the embodiments set forth herein, but on the contrary, the disclosure will cover all modifications, equivalents, and alternatives that fall within the spirit and scope of the embodiments.

The following detailed description of the application is mainly carried out by referring to a child stroller, however, the braking mechanism according to the application can also be applied to other occasions, such as supermarket shopping carts, children's dining chairs, and the like. The braking mechanism according to the application can prevent the false locking phenomenon, effectively improve the reliability of the locked state, and thusly improve the safety in use.

The child stroller and its braking mechanism according to the application will be described in detail hereinbelow with reference to the accompanying drawings.

Figure 1:
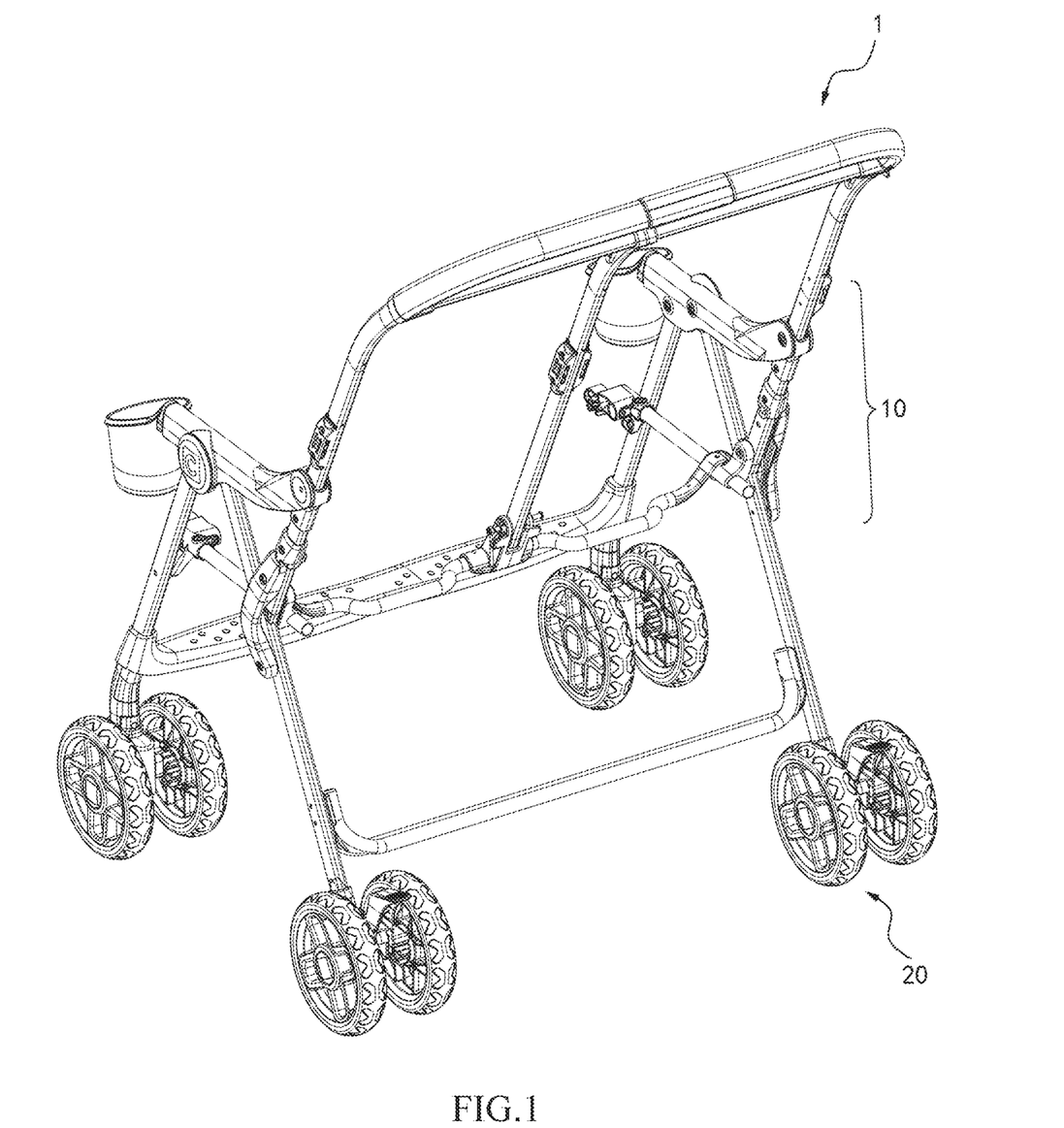
FIG. 1 is a schematic view showing a structure of a child stroller according to an embodiment of the application.

FIG. 1 is a schematic view showing a structure of a child stroller 1 according to the application. As shown, the child stroller 1 generally includes a frame structure 10 and a wheel set 20. In the illustrated embodiment, the child stroller 1 includes four wheel sets 20, wherein two wheel sets 20 are arranged on a front side of the child stroller 1, and two wheel sets 20 are arranged on a rear side of the child stroller 1. A seat part, a backrest part, and the like, which are not shown in the drawings, are all arranged on the frame structure 10. Moreover, the application focuses on the structure of the wheel set 20.

Figure 2:
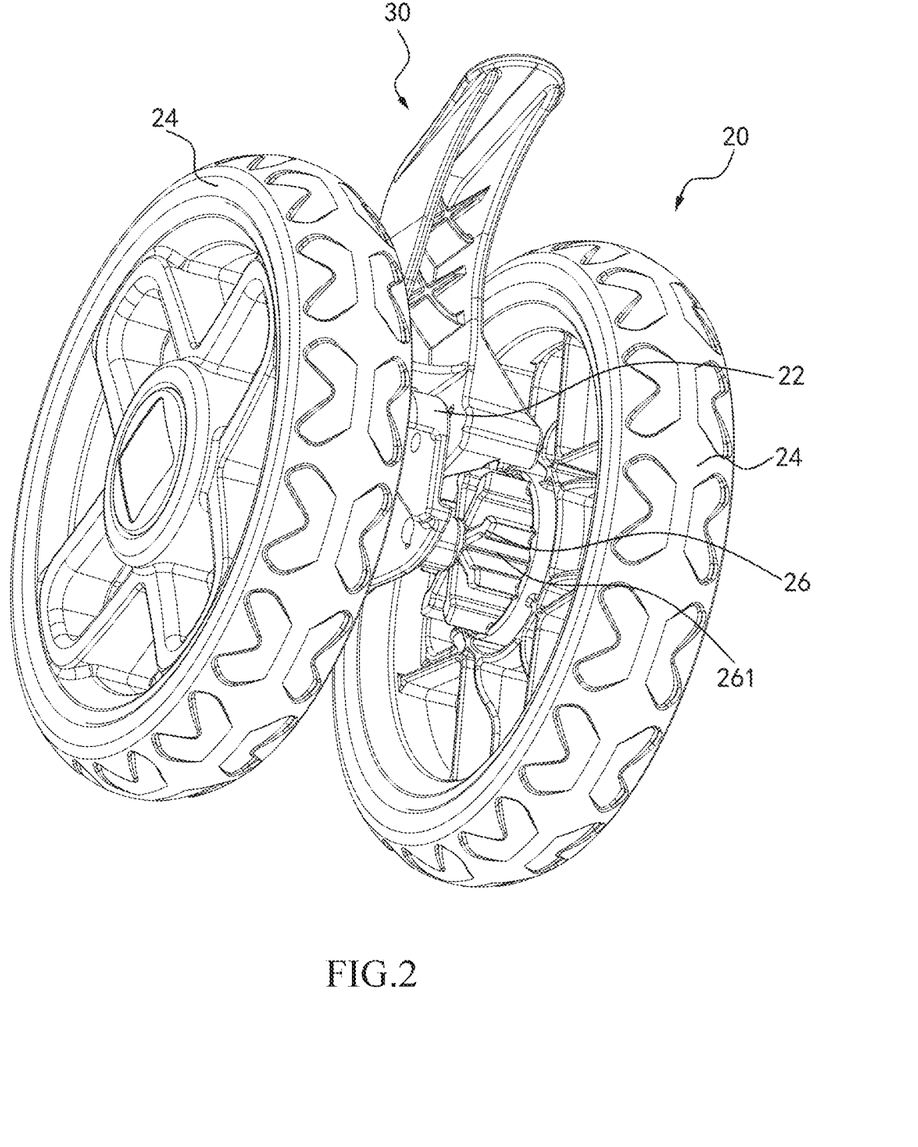
Figure 3:
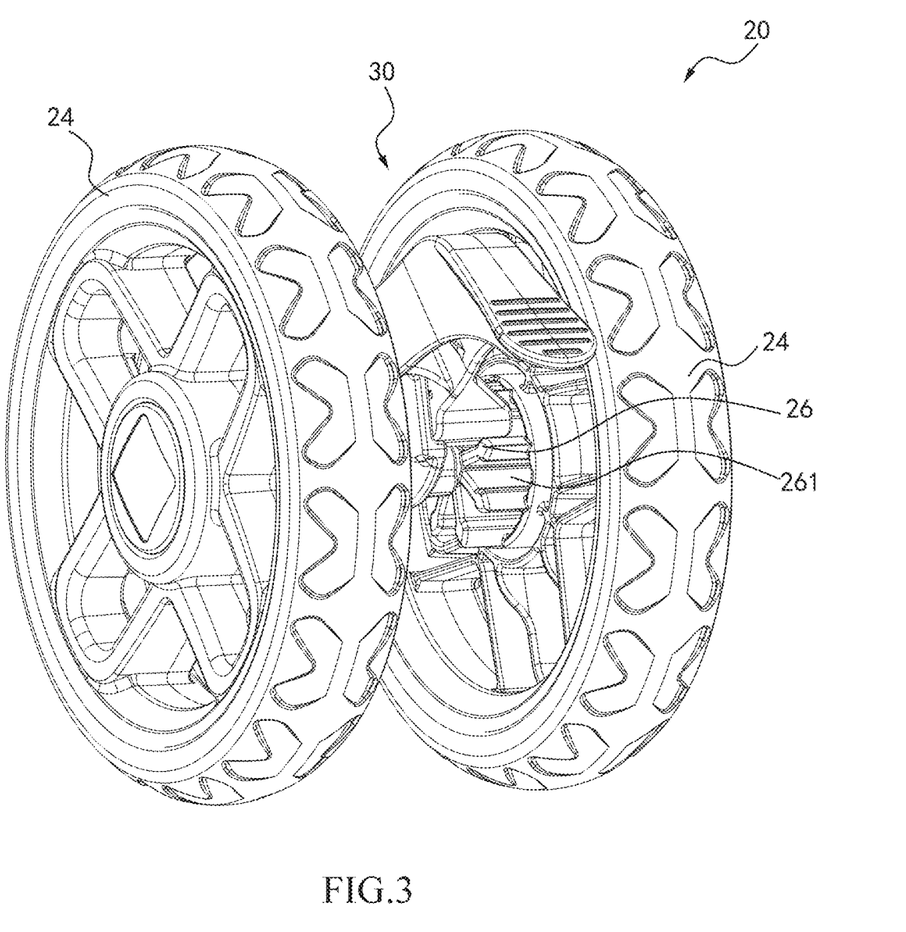
Figure 4:
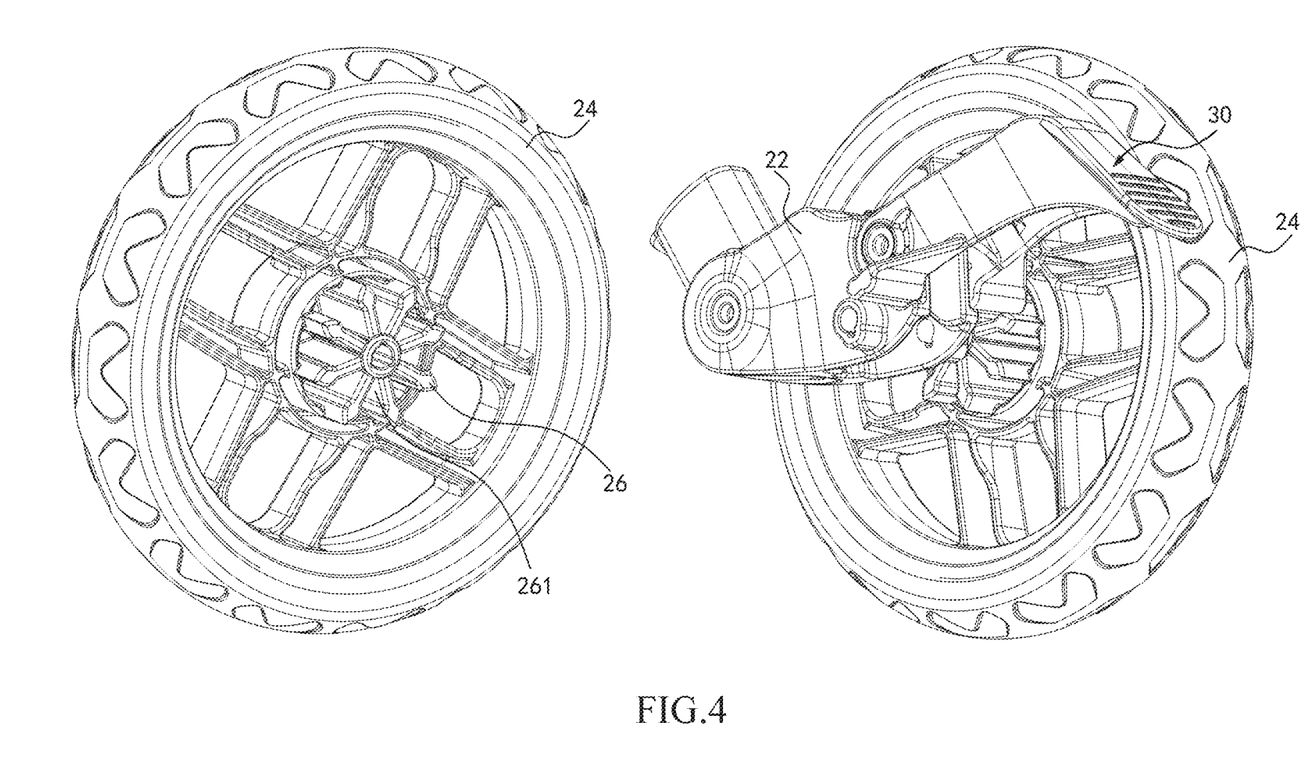
FIG. 4 is an exploded structural schematic view showing a wheel set of the child stroller according to the application.
Figure 5:
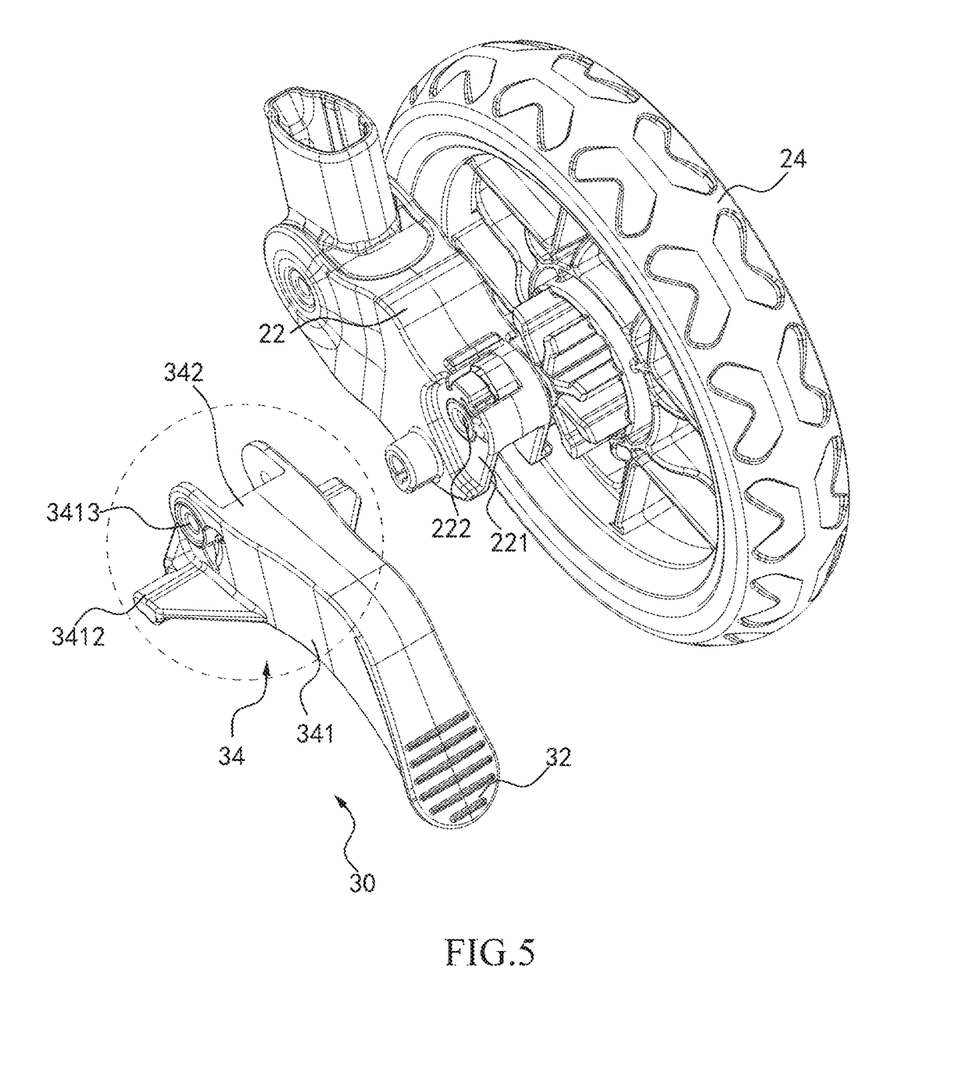
FIG. 5 is a schematic view showing a braking mechanism of the child stroller according to the application.

Please refer to FIGS. 2 and 3. FIGS. 2 and 3 both are structural schematic views showing the wheel set(s) 20 of the child stroller 1 according to the application, and the pedal part 32 in FIG. 2 is not stepped on, while the pedal part 32 in FIG. 3 has been stepped on. Specifically, according to the illustrated embodiment, each wheel set 20 includes two wheels 24, the two wheels 24 are respectively arranged on both sides of a wheel base 22. Furthermore, an inner circumference of each wheel 24 includes a hub 26, and a plurality of slots 261 are formed between the hubs 26. Of course, each wheel set 20 can also be provided with an appropriate number of wheels according to actual conditions. Furthermore, the braking mechanism 30 according to the application is arranged on the wheel set 20, specifically, on the wheel base 22 of the wheel set 20. Further, referring to FIGS. 4 and 5, where FIG. 4 is an exploded structural schematic view showing a wheel set 20 of the child stroller 1 according to the application, and FIG. 5 is a schematic view showing the braking mechanism 30 of the child stroller 1 according to the application.

As described above, the braking mechanism 30 is arranged on the wheel base 22 between the two wheels 24. The braking mechanism 30 specifically includes a pedal part 32 and a housing part 34 connected to the pedal part 32, and the housing part 34 has two side walls 341 and a middle wall 342 sandwiched between the two side walls 341. A locking end 3412 is disposed on an outer side of each of the side walls 341. The locking ends 3412 arranged on the outer sides of each of the two side walls 341 can be inserted into the slots 261 between the hubs 26, such that the wheel set 20 of the child stroller 1 can be locked. Locking between the locking ends 3412 and the slots 261 can be operated by the pedal part 32. For example, in the state shown in FIG. 2, the pedal part 32 is not stepped on, so the locking ends 3412 are not inserted into one of the slots 261, and the wheels 24 can be rotated at will. Moreover, in the state shown in FIG. 3, the pedal part 32 is stepped on, which brings the housing part 34 to be pivotally moving downward, such that the locking ends 3412 are inserted into the slots 261 to achieve locking. At this time, the wheels 24 are locked, and the child stroller 1 cannot be pushed further.

Perforations 3413 are disposed on the side walls of the housing part 34.

Correspondingly, holes 222 are also formed on both sides of the wheel base 22. In addition, as clearly shown in FIG. 5, two depressions 221 are also formed on both sides of the wheel base 22. When the braking mechanism 30 is installed on the wheel set 20, the housing part 34 of the braking mechanism 30 is cooperatively accommodated in the depressions 221. At the same time, the perforations 3413 on the side walls of the housing part 34 are aligned with the holes 222 on the sides of the wheel base 22, and an un-shown pivot may pass through both the perforations 3413 and the holes 222, such that the housing part 34 of the braking mechanism 30 is pivotally connected to the wheel base 22 of the wheel set 20. In at least one embodiment, the pivot is a pin that extends through perforations 3413 and holes 222 to secure braking mechanism 30 to wheel set 20. In the embodiment shown in the drawings, the two side walls 341 of the housing part 34 are arranged left and right symmetrically, and correspondingly, the locking ends 3412 are also arranged left and right symmetrically, but other arrangements are possible. In at least one embodiment, the locking ends 3412 are arranged asymmetrically on the housing part 34.

Figure 6:
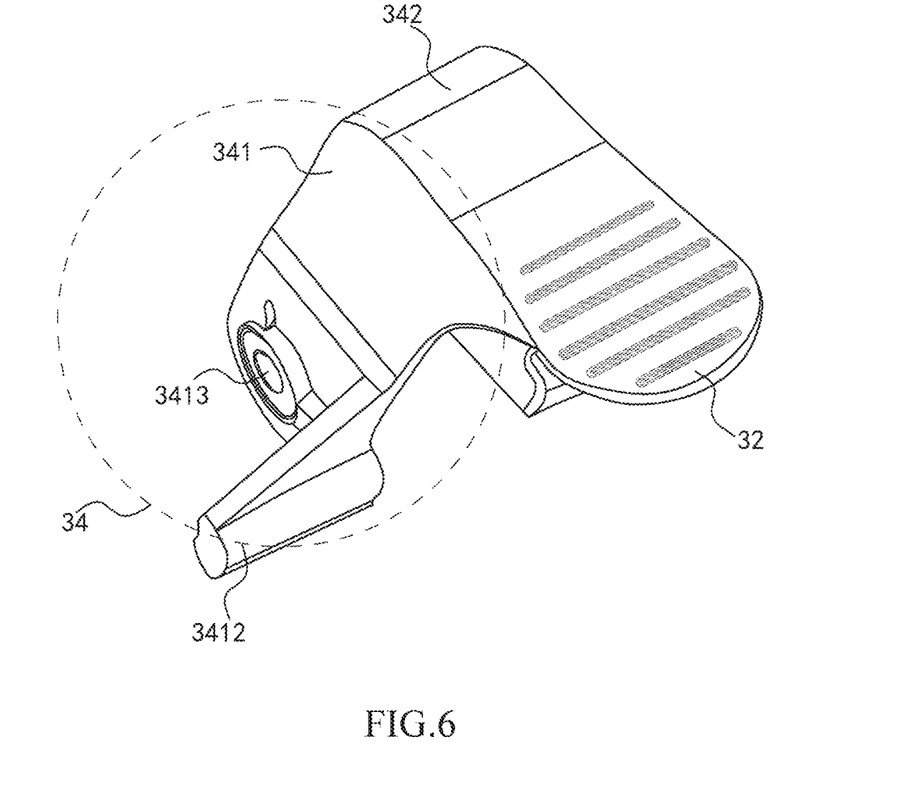
FIG. 6 is a schematic view showing a specific structure of a housing part of the braking mechanism of the child stroller according to another embodiment of the application.

In the structure shown in FIG. 5, the perforations 3413 of the housing part 34 are located at upper positions of the side walls 341, and the middle wall 342 is approximately flat between the two side walls 341, moreover, the locking ends 3412 and the perforations 3413 are arranged in an up-down direction with respect to the surface on which the stroller 1 is located. FIG. 6 shows the specific structure of the housing part 34 of the braking mechanism 30 of the second embodiment of the child stroller 1 according to the application. In this embodiment, the locking ends 3412 and the perforations 3413 are arranged in an approximately front-rear direction with respect to the surface on which the stroller 1 is located, and the middle wall 342 between the two side walls 341 is configured to be approximately U-shaped. In addition, in the embodiment shown in FIG. 6, an angle between the pedal part 32 and the housing part 34 is further reduced compared to the case shown in FIG. 5. In the embodiment shown in FIG. 6, the pedal part 32 and the housing part 34 form an angle of approximately 90 degrees with respect to each other. The connection between the housing part 34 and the wheel base 22 illustrated in this embodiment is the same as that described above.

Figure 7:
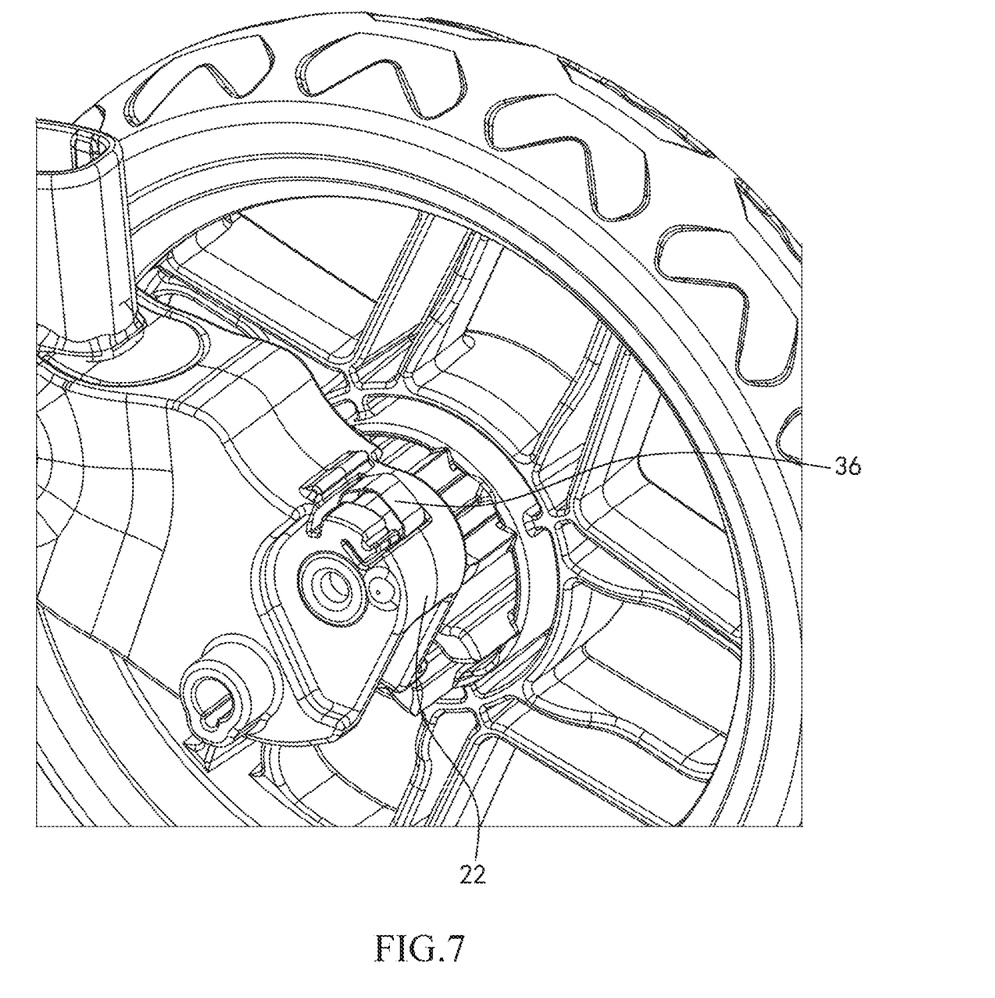
FIGS. 7 and 8 are both schematic views showing a specific structure of an elastic piece part of the braking mechanism of the child stroller according to the application.
Figure 8:
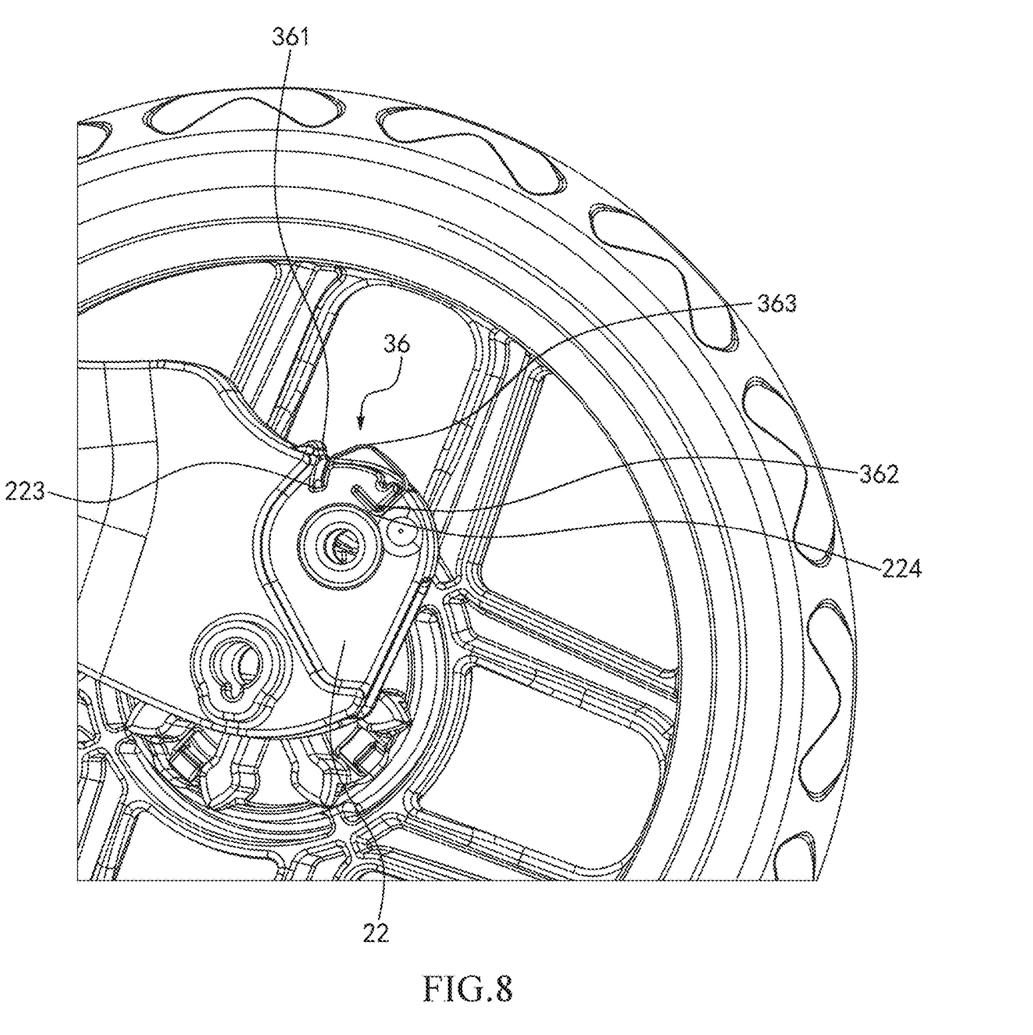

Next, the specific arrangement of the elastic piece part 36 will be described in detail with reference to FIGS. 7 and 8, where both FIGS. 7 and 8 show the specific structure of the elastic piece part 36 of the braking mechanism 30 of the child stroller 1 according to the application. The braking mechanism 30 according to the application further includes an elastic piece part 36 which is embedded in the wheel base 22. The elastic piece part 36 is provided with a highest point 363, and a first end 361 and a second end 362 located on both sides of the highest point 363. When the elastic piece part 36 is inserted into the wheel base 22, the highest point 363 of the elastic piece part 36 is exposed to the outside. In the shown specific embodiment, the second end 362 of the elastic piece part 36 is L-shaped, and the highest point 363 is located at a nearly middle position of the elastic piece part 36. However, the elastic piece part can also be arranged as its first end 361 is L-shaped, and the highest point 363 can also be arranged at other positions. Correspondingly, in the shown embodiment, the wheel base 22 is provided with a first recess 223 and a second recess 224 which respectively correspond to the first end 361 and the second end 362 of the elastic piece part 36 of the braking mechanism 30, such as shown in FIG. 8. The first end 361 of the elastic piece part 36 is arranged in the first recess 223 on the wheel base 22, and the second end 362 of the elastic piece part 36 is arranged in the second recess 224 on the wheel base 22. Corresponding to the first end 361 and the second end 362 of the elastic piece part 36, one of the first recess 223 and the second recess 224 may be L-shaped.

Figure 9:
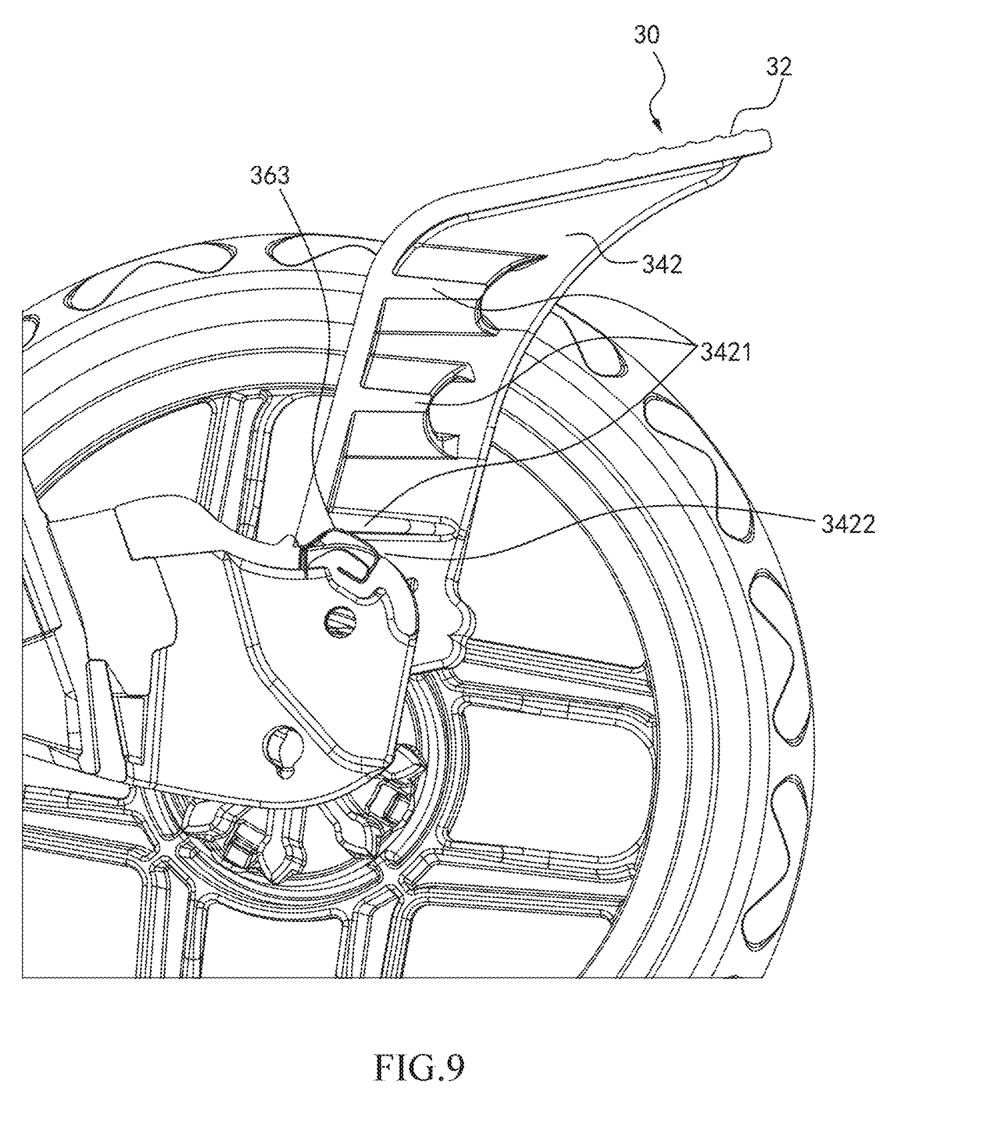
FIG. 9 is a schematic view showing a cooperative relationship between the pedal part and the elastic piece part in the braking mechanism of the child stroller according to the application.

The cooperative relationship between the pedal part 32 and the elastic piece part 36 in the braking mechanism 30 of the child stroller 1 according to the application is shown in FIG. 9. Referring to FIG. 9, a sliding groove 3422 is disposed on an inner surface of the middle wall 342 of the housing part 34. Specifically, a plurality of ribs 3421 are disposed on the inner surface of the middle wall 342, and the sliding groove 3422 is formed between one of the ribs 3421 and the inner surface of the middle wall 342. The ribs 3421 may only extend along the inner surface of the middle wall 342 and accordingly the sliding groove 3422 is only arranged on the inner surface of the middle wall 342. Optionally, the ribs 3421 may also extend along both the inner surface of the middle wall 342 and the inner surface of each of the side walls 341. In this way, the sliding groove 3422 is formed along the inner surface of the middle wall 342 and the inner surface of each of the side walls 341. In at least one embodiment, the highest point 363 of the elastic piece part 36 abuts against the sliding groove 3422.

Figure 10:
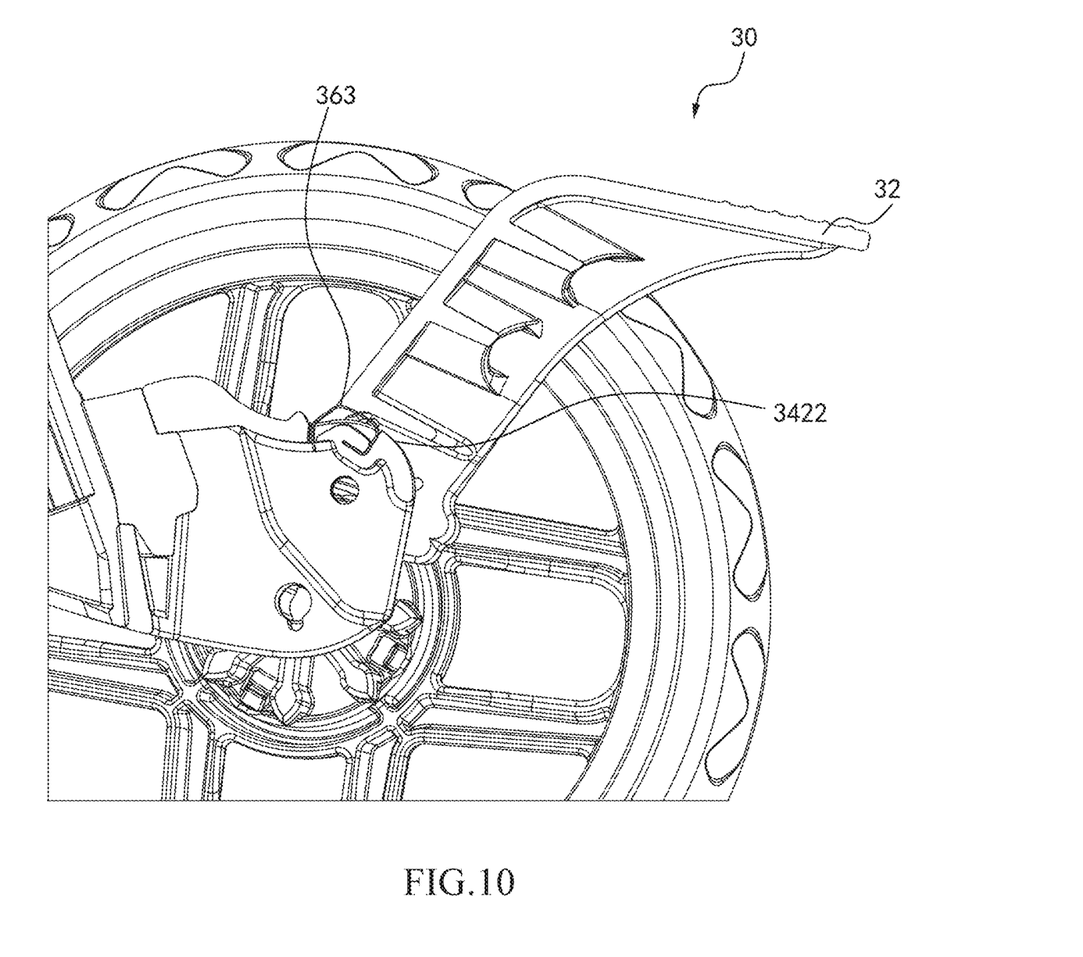
FIG. 10 is a schematic view showing the braking mechanism of the child stroller according to the application starting in which the braking mechanism starts to enter a locked state.
Figure 11:
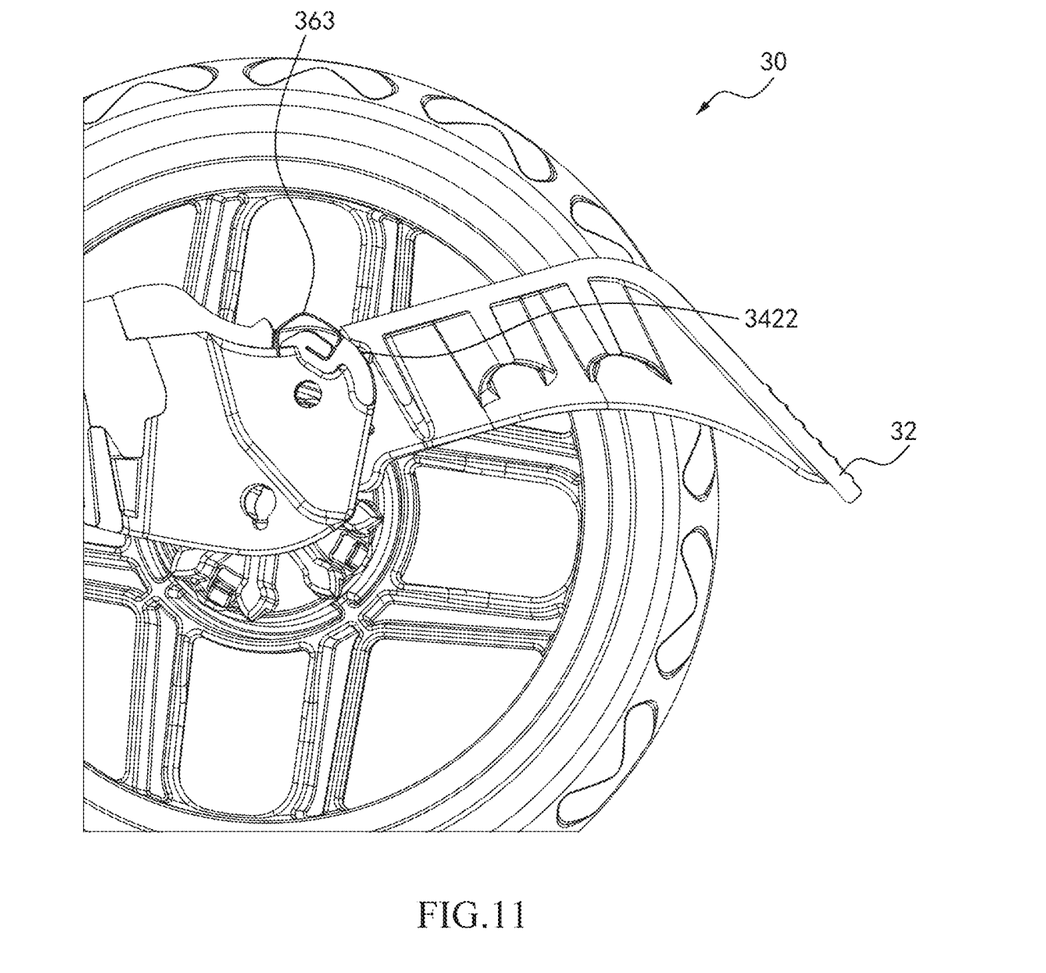
FIG. 11 is a schematic view showing the braking mechanism of the child stroller according to the application in which the braking mechanism has completed the locked state.

Specifically, how the braking mechanism 30 according to the application prevents false locking will be described hereinbelow with reference to FIGS. 10 and 11. FIG. 10 is a schematic view showing the braking mechanism 30 of the child stroller 1 according to the application in which the braking mechanism starts to enter a locked state; and FIG. 11 is a schematic view showing the braking mechanism 30 of the child stroller 1 according to the application in which the braking mechanism has completed the locked state. During the process of the operator stepping on the pedal part 32, as the pedal part 32 is pivoted downwardly, the sliding groove 3422 on the middle wall 342 begins to contact the highest point 363 of the elastic piece part 36, as shown in FIG. 10. At this time, if the operator mistakenly believes the wheels 24 have been locked and stops stepping, the elastic piece part 36 will push the pedal part 32 in an unlocking direction, that is, the elastic piece part 36 will push the pedal part 32 to be pivoted upwardly. Thusly, the operator will obviously feel that the pedal part 32 has not been stepped on in place and will continue to step on the pedal part 32 downwardly. Once the sliding groove 3422 on the housing part 34 has passed the highest point 363 of the elastic piece part 36, the elastic piece part 36 will continue to push the pedal part 32 to continue to move toward the locking position until it is locked in place. Until the sliding groove 3422 passes the highest point 363 of the elastic piece part 36, the elastic nature of the elastic piece part 36 applies force to the pedal part 32 to return the pedal part to the unlocked state. After the sliding groove 3422 passes the highest point 363 of the elastic piece part 36, the elastic nature of the elastic piece part 36 applies force to the pedal part 32 to move the pedal part to the locked state. Moreover, when the sliding groove 3422 passes the highest point 363, an audible sound will be emitted to remind the operator that the pedal part 32 has been stepped on in place and the wheels 24 have been locked.

Therefore, in the braking mechanism 30 according to the application and the child stroller 1 including the braking mechanism 30, the braking mechanism 30 can achieve the function of preventing false locking through a cooperation between the highest point 363 of the elastic piece part 36 and the sliding groove 3422 of the housing part 34, and after the sliding groove 3422 has passed the highest point 363 of the elastic piece part 36, the operator can confirm by himself through the sound that the child stroller 1 has been effectively locked, or if the sliding groove 3422 has not passed the highest point 363 of the elastic piece part 36, the operator can know that the stroller 1 is not effectively locked through the stepping feeling of the pedal part 32, so the braking mechanism 30 according to the application effectively avoids the false locking phenomenon of the child stroller 1 and greatly improves the safety of the child stroller 1 in use. After the pedal part 32 is in the locked state, the operator applies force (e.g., by lifting up using a foot) on the underside of the pedal part causing the sliding groove 3422 to pass the highest point 363 of the elastic piece part 36 and return to the unlocked state. Moving the pedal part 32 to the unlocked state also removes the locking end 3412 from the slot 261 and the stroller is able to roll freely.

Since the features of the disclosure can be embodied in various forms without departing from the characteristics of the disclosure, it should also be understood, the above embodiments are not limited to any details described above, unless otherwise noted; rather, it should be interpreted broadly as being within the scope defined by the appended claims. Therefore, all modifications and variations falling within the scope and limits of the claims or equivalent solutions of such scope and limits shall be covered by the appended claims.

LIST OF REFERENCE SIGNS

| | | |
|---|---|---|
| 1: child stroller | | |
| 10: frame structure | | |
| 20: wheel set | | |
| 22: wheel base | | |
| 221: depressions | 222: hole  223 first recess | 224: second recess |
| 24: wheel | | |
| 26: hub | | |
| 261: slot | | |
| 30: braking mechanism | | |
| 32: pedal part | | |
| 34: housing part | | |
| 341: side wall | 3412: locking end | 3413: perforation |
| 342: middle wall | 3421: rib | 3422: sliding groove |
| 36: elastic piece part | | |
| 361: first end | 362: second end | 363: highest point |

What is claimed is:

1. A braking mechanism comprising:
a pedal part; and
a housing part connected to the pedal part, the housing part having two side walls and a middle wall sandwiched between the two side walls, a locking end being arranged on an outer side of each of the side walls, and a sliding groove being arranged on an inner surface of the middle wall, wherein
the braking mechanism is further provided with an elastic piece part,
the elastic piece part has a highest point,
the braking mechanism is prevented from a false locking through a cooperation of the sliding groove and the highest point, and
a movement of the pedal part is independent from the elastic piece part such that a position of the highest point is maintained while the pedal part is moved in a locking direction.

2. The braking mechanism according to claim 1, wherein the pedal part and the housing part are integrally formed with an angle with respect to each other.

3. The braking mechanism according to claim 2, wherein the pedal part and the housing part are integrally formed with an angle of 90 degrees with respect to each other.

4. The braking mechanism according to claim 1, wherein the two side walls of the housing part are symmetrically arranged, and two said locking ends are respectively symmetrically arranged on the outer sides of the two side walls.

5. The braking mechanism according to claim 4, wherein perforations are disposed on the side walls.

6. The braking mechanism according to claim 4, wherein the locking ends and the perforations are arranged in an up-down direction or in a front-rear direction.

7. The braking mechanism according to claim 1, wherein a plurality of ribs are disposed on the inner surface of the middle wall, and the sliding groove is formed between one of the ribs and the inner surface of the middle wall.

8. The braking mechanism according to claim 7, wherein the ribs extend along the inner surface of the middle wall and inner surfaces of the side walls.

9. The braking mechanism according to claim 1, wherein the elastic piece part comprises a first end and a second end located on both sides of the highest point, and one of the first end or the second end is L-shaped.

10. The braking mechanism according to claim 9, wherein the highest point is located at a middle position of the elastic piece part.

11. A child stroller comprising
a frame structure; and
a wheel set, and the wheel set having the braking mechanism according to claim 1.

12. The child stroller according to claim 11, wherein the wheel set comprises a wheel base, two wheels mounted on both sides of the wheel base, and hubs disposed on inner circumferences of the wheels, and slots for engaging the locking ends of the braking mechanism are formed between the hubs.

13. The child stroller according to claim 11, wherein holes are formed on both sides of the wheel base, and the holes correspond to perforations of the braking mechanism for pivotally connecting the braking mechanism to the wheel base.

14. The child stroller according to claim 13, wherein two depressions are formed on both sides of the wheel base for the two side walls of the braking mechanism to be accommodated therein.

15. The child stroller according to claim 11, wherein two depressions are formed on both sides of the wheel base for the two side walls of the braking mechanism to be accommodated therein.

16. The child stroller according to claim 11, wherein the wheel base is provided with a first recess and a second recess respectively corresponding to the first end and the second end of the elastic piece part of the braking mechanism, and one of the first recess or the second recess is L-shaped.

17. A braking mechanism comprising:
a pedal part; and
a housing part connected to the pedal part, the housing part having two side walls and a middle wall sandwiched between the two side walls, a locking end being arranged on an outer side of each of the side walls, and a sliding groove being arranged on an inner surface of the middle wall,
wherein the braking mechanism is further provided with an elastic piece part, and the elastic piece part is provided with a highest point, the braking mechanism is prevented from a false locking through a cooperation of the sliding groove and the highest point, and
wherein the pedal part and the housing part are integrally formed with an angle with respect to each other.

18. A braking mechanism comprising:
a pedal part; and
a housing part connected to the pedal part, the housing part having two side walls and a middle wall sandwiched between the two side walls, a locking end being arranged on an outer side of each of the side walls, and a sliding groove being arranged on an inner surface of the middle wall, wherein the braking mechanism is further provided with an elastic piece part, and the elastic piece part is provided with a highest point, the braking mechanism is prevented from a false locking through a cooperation of the sliding groove and the highest point, and wherein the two side walls of the housing part are symmetrically arranged, and two said locking ends are respectively symmetrically arranged on the outer sides of the two side walls.

* * * * *